United States Patent Office 3,261,837
Patented July 19, 1966

3,261,837
PROCESS FOR THE PRODUCTION OF
QUINACRIDINE DIONES
Hans Bohler, Basel, Switzerland, assignor to Sandoz Ltd.
(also known as Sandoz A.G.), Basel, Switzerland
No Drawing. Filed May 9, 1963, Ser. No. 279,337
Claims priority, application Switzerland, May 15, 1962,
5,892/62; July 31, 1962, 9,144/62 and 9,145/62; Apr.
9, 1963, 4,519/63
5 Claims. (Cl. 260—279)

Quinacridine diones, termed hereunder quinacridones, are known compounds which are suitable in finely divided form for the pigmentation of lacquer media and plastics. Several methods are known whereby linear quinacridones can be produced by condensation of bis-(arylamino)-benzenedicarboxylic acids or the esters of these acids. An example is the production of quinacridine-7,14-diones according to the following formula:

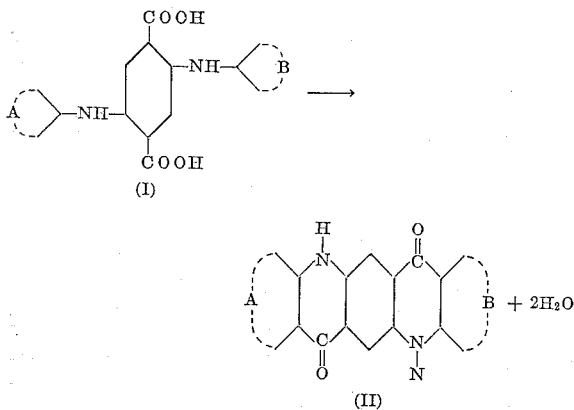

In Formula II A and B represent the atoms necessary for the completion of an aromatic isocyclic or heterocyclic radical. These radicals may be identical or different. They are preferably phenylene radicals or radicals of condensed ring systems consisting entirely of 6 rings or of 6 and 5 rings which may be substituted. Suitable radicals of this type are, for example, those of naphthalene, anthraquinone, pyrene and carbazol. The substituents on the rings containing A and B may be e.g. halogen atoms or nitro, cyan or amino groups, or any of the following groups which may be further substituted: alkyl, alkoxy, aryl, aryloxy, azoaryl, alkylamino, arylamino, alkylsulphonyl, arylsulphonyl, acyl, acylamino, carboxylic acid or sulphonic acid ester groups, or other, preferably non-ionic and non-water-solubilising substituents. The radicals containing A and B may bear identical or different substituents.

Consequently the quinacridone molecule may be asymmetrical even when the rings containing A and B are identical.

According to H. Liebermann (Liebig's Annalen der Chemie 518, p. 246) the condensation can be carried out with the aid of zinc chloride, benzoyl chloride, aqueous hydrobromic acid, hydrogen bromide in glacial acetic acid, phosphorus pentoxide in tetrahydronaphthalene or cymene, phosphorus pentachloride together with aluminium chloride in benzene, or with boric acid in the melt. In other methods hydrofluoric acid, phthalic anhydride, or metal halides are used, the condensation being performed in the melt or in the presence of an indifferent organic solvent. Further, sulphuric acid or its derivatives have been used as condensing agents. These methods yield sulphonated quinacridones from which the sulphonic acid groups must be split off under pressure.

In these known methods the quinacridones are obtained in unsatisfactory yield, and in part the methods are technically difficult.

Good yields are obtained when the condensation is effected with the aid of polyphosphoric acid in the melt, but unless the condensation products are aftertreated they do not have the high brilliance and the low grain hardness that are required of pigments.

Further, it is known (N. Anitschkoff, Berlin University thesis, 1934) that the action of phosphorus oxychloride upon 2,5-bis-(phenylamino)-terephthalic acid or its derivatives that are substituted in the terminal nuclei in the absence of solvents or diluents gives rise to products of different constitution whose solutions in alcoholic potassium hydroxide solution are not blue like those of quinacridones but emerald-green.

It has now been found that it is especially advantageous to produce quinacridones from bis-(arylamino)-benzenedicarboxylic acids or their esters more particularly from 2,5-diarylaminoterephthalic acids or their esters with the aid of phosphorus halides in particular phosphorus oxychloride as condensing agents and in the presence of an organic solvent for the condensing agent used. The solvent does not take part in the reaction, i.e. it is indifferent.

The condensation products are obtained in good yield and purity and have low grain hardness and high brilliance of shade without aftertreatment. This process is particularly well suited for the production of compounds of Formula II and primarily for those compounds of that formula in which A and B represent the atoms necessary for the completion of a benzene ring which may be unsubstituted or substituted so that the molecule of the quinacridone obtained contains 1 or 2 nitro groups, 1 to 4 and especially 1 or 2 lower alkyl groups each with 1 to 4 C atoms, 1 to 4 and especially 1 or 2 lower alkoxy groups each with 1 to 4 C atoms, 1 or 2 cyan groups, 1 or 2 methylsulfonyl groups, or 1 to 4 halogen atoms, more particularly chlorine or bromine atoms. The quinacridone molecule, when not unsubstituted, contains preferably 1 to 4 identical or different substituents of the aforenamed types.

In general not less than 0.4 mole and not more than approximately 3 moles of the phosphorus halide are employed to 1 mole of bis-(arylamino)-benzenedicarboxylic acid or the ester of the acid; the optimum amounts are 0.5 to 1.5 moles of phosphorus halide.

In addition to phosphorus oxychloride, for example phosphorus oxybromide, phosphorus tri- and pentachloride, phosphorus tri- and penta-bromide, and mixtures of these phosphorus halides can be used as condensing agents. The best solvents are those which have good dissolving action on the condensing agent used at the temperature of condensation and whose boiling points are between 100° and 300° C., preferably within the range 150–270° C. Examples of solvents that are particularly suitable are aromatic hydrocarbons, e.g. diphenyl, hydrogenated aromates, e.g. tetrahydronaphthalene and hexahydronaphthalene, halogenated aromates, e.g. dichlorobenzenes and trichlorobenzenes, 1-chloronaphthalene and 2-chloronaphthalene, alkylated aromates, e.g. 1-methylnaphthalene and 2-ethylnaphthalene, nitrated aromates, e.g. nitrobenzene, p-nitro-diphenyl, o-nitrodiphenyl and 1-nitronaphthalene, diphenyl ether, diphenyl oxide, chloronitrobenzene, the eutectic mixture of diphenyl and diphenyl oxide or other mixtures of the solvents named supra. The most preferred groups of solvents are the hydrocarbons, the halogenated hydrocarbons and the nitrated hydrocarbons.

The most favourable procedure is to heat the starting acid, for instance 2,5-bis-(arylamino)-terephthalic acid, and the solvent to about 75° to 350° C., or preferably 150° to 270° C., and to add at this temperature the phosphorus halide, if necessary dissolved in a small amount of solvent, and to stir the mass for some time —about 15 minutes to 5 hours depending on the starting material—at the same high temperature. The reaction product is then precipitated. It can be worked up as desired, e.g. diluted with a solvent such as methanol, filtered off, washed with solvent and possibly with dilute ammonia to remove any residual acid, and then dried.

The compounds obtained are brilliant pigments insoluble in standard solvents. Being soft grained, they are particularly well suited for the pigmentation of lacquer media, printing inks and plastics in the mass. The pigmentations have good colour fastness properties, notably good fastness to light, heat and solvents, and do not show bleeding.

In the examples the parts and percentages are by weight and the temperatures in degrees centigrade.

EXAMPLE 1

To a solution of 20 parts of 2-phenylamino-5-(4'-methylphenylamino)-terephthalic acid in 480 parts of nitrobenzene at 205° is added in 2 minutes with vigorous stirring a mixture of 8.5 parts of phosphorus oxychloride and 54 parts of nitrobenzene. After stirring for a further 30 minutes at this temperature, the reaction mass is allowed to cool to 95° and 25 parts of water are added. This is followed by stirring for 15 minutes at 95–100°, after which the mass is diluted at 80° with 480 parts of methanol. The precipitate is filtered off at room temperature, washed successively with methanol, dilute aqueous ammonia, and water, and dried at 60° in vacuum. 17.6 parts of red-violet linear 2-methylquinacridine-7,14-dione are obtained. The yield is 97.8% of theory. The product can be used immediately for the pigmentation of lacquer media or plastics, e.g. polyvinyl chloride, polyolefins and polystyrene.

The phosphorus oxychloride can be replaced by 20.9 parts of phosphorus tribromide or by 14 parts of phosphorus pentabromide.

Starting from the same amount of 2,5-bis-(phenylamino)-terephthalic acid, the linear quinacridone is obtained in almost quantitative yield.

Other solvents besides methanol can be used for dilution, e.g. ethanol, dimethyl formamide, dimethyl sulphoxide, dimethyl acetamide, N-methylformamide and pyridine.

EXAMPLE 2

A mixture of 5.9 parts of phosphorus oxychloride and 73.5 parts of trichlorobenzene is added to a mixture of 20 parts of 2-phenylamino-5-(4'-methylphenylamino)-terephthalic acid and 735 parts of trichlorobenzene at 215° in 30 minutes with constant stirring. After stirring for a further 30 minutes at this temperature the mass is allowed to cool to 95°, 25 parts of water are added, and it is then stirred for 15 minutes at 95°–100° and subsequently diluted with 700 parts of methanol at 80°. The precipitate is filtered off at room temperature, washed successively with methanol, dilute aqueous ammonia, and water, and dried at 60° in vacuum. The product is 17.9 parts of 2-methylquinacridone-7,14-dione. The yield is 99.5 of theory.

The phosphorus oxychloride can be replaced by 10.6 parts of phosphorus trichloride or 4.6 parts of phosphorus pentachloride, and the 20 parts of 2-phenylamino-5-(4'-methylphenylamino)-terephthalic acid can be replaced by 20 parts of 2,5-di-(4'-methylphenylamino)-terephthalic acid, the procedure being otherwise the same as above.

The solvent trichlorobenzene can be replaced by the same amount of one of the following: nitrobenzene, 1- or 2-chloronaphthalene, 1-methylnaphthalene, 2-ethylnaphthalene, hexahydronaphthalene, or tetrahydronaphthalene, and the reaction can be effected at temperatures up to the boiling point of these solvents.

The quinacridones obtained in this way can be used immediately for the pigmentation of lacquer media, printing inks or plastics, e.g. polyvinyl chloride, polyolefins and polystyrene. If desired, they can be purified, e.g. by precipitation from solution in 70–85% sulphuric acid.

EXAMPLE 3

7.6 parts of phosphorus oxychloride are added to a mixture of 20 parts of 2-phenylamino-5-(4'-methylphenylamino)-terephthalic acid and 440 parts of trichlorobenzene at 25°. The reaction mixture is constantly stirred and its temperature continuously increased as follows: from 25° to 75° in 3 hours, from 75° to 100° in 6 hours, from 100° to 110° in 14 hours, from 110° to 185° in 4 hours, and from 185° to 200° in 4½ hours. It is then cooled to 95° and 25 parts of water are added. After stirring for 15 minutes at 95–100° the product is isolated and worked up as described in Example 1, with vacuum drying at 60°. 17.3 parts of 2-methylquinacridine-7,14-dione are obtained. The yield is 96% of theory.

EXAMPLE 4

A mixture of 11.9 parts of phosphorus oxychloride and 54 parts of nitrobenzene is added to a mixture of 20 parts of 2-phenylamino-5-(4'-methylphenylamino)-terephthalic acid and 480 parts of nitrobenzene at 155° in 2 minutes with thorough stirring.

Stirring is continued for 30 minutes at this temperature, then the mass is cooled to 95°, 25 parts of water are added, stirring is resumed for 15 minutes at 95–100°, and the mass finally diluted with 480 parts of methanol at 80°. The precipitate is filtered off at room temperature, washed consecutively with methanol, dilute aqueous ammonia, and water, and dried at 60° in vacuum.

14.8 parts of red-violet linear 2-methylquinacridine-7,14-dione are obtained. The yield is 82.2% of theory. The product can be used immediately for pigmentation.

EXAMPLE 5

A solution of 22.1 parts of phosphorus oxychloride and 73.5 parts of trichlorobenzene is added to a mixture of 20 parts of 2,5-di-(3'-chlorophenylamino)-terephthalic acid and 735 parts of trichlorobenzene at 215° in 30 minutes with stirring. The procedure is the same as that of Example 2. The product, 3,10-dichloroquinacridine-7,14-dione, is obtained in good yield. In place of phosphorus oxychloride the equivalent amount of phosphorus oxybromide can be employed with equal success.

The 20 parts of 2,5-di-(3'-chlorophenylamino)-terephthalic acid can be replaced by 20 parts of 2,5-di-(2'-chlorophenylamino)-terephthalic acid or by 20 parts of 2,5-di-(4'-chlorophenylamino)-terephthalic acid.

In the table below are set forth further quinacridine-7,14-diones which are obtainable according to the procedures detailed in the foregoing examples. They are formed by ring closure of a 2,5-diarylaminoterephthalic acid of the formula

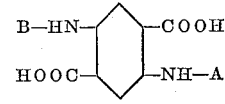

which can also be employed in the form of its esters, preferably its low molecular alkyl esters, having from 1 to about 4 carbon atoms in the alcohol radical, e.g. its methyl or ethyl esters, and are characterised in the table by the radicals A and B.

Table

| Example No. | Radical A | Radical B |
|---|---|---|
| 6 | Phenyl | 3-methoxyphenyl. |
| 7 | do | 2-bromophenyl. |
| 8 | do | 1-bromophenyl. |
| 9 | do | 1-fluorophenyl. |
| 10 | do | 4-fluorophenyl. |
| 11 | 1-bromophenyl | 1-chlorophenyl. |
| 12 | 2-bromophenyl | 2-bromophenyl. |
| 13 | 1-fluorophenyl | 1-fluorophenyl. |
| 14 | 2-nitrophenyl | 2-nitrophenyl. |
| 15 | Phenyl | α-Naphthyl. |
| 16 | α-Naphthyl | α-Naphthyl. |
| 17 | β-Naphthyl | β-Naphthyl. |
| 18 | Pyrenyl | Pyrenyl. |
| 19 | 3-chlorophenyl | Do. |
| 20 | β-Naphthyl | Do. |
| 21 | β-Naphthyl | 3-bromophenyl. |
| 22 | Phenyl | Carbazyl. |
| 23 | 2-nitrophenyl | Do. |
| 24 | Phenyl | 2-cyanophenyl. |
| 25 | do | 3-methylsulphonylphenyl. |
| 26 | do | 3-trifluorophenyl. |
| 27 | 4-chloro-2-methylphenyl | 4-chloro-2-methylphenyl. |
| 28 | 2.3-dichlorophenyl | 2-chlorophenyl. |
| 29 | 2.5-dichlorophenyl | 2.5-dichlorophenyl. |

EXAMPLE 30

A mixture of 5.9 parts of phosphorus oxychloride and 73.5 parts of trichlorobenzene is added in 30 minutes with stirring to a mixture of 20 parts of 2-phenylamino-5-(4'-chlorophenylamino)-terephthalic acid and 735 parts of trichlorobenzene at 215°. Stirring is continued for a further 30 minutes at this temperature. The obtained precipitate is filtered off at room temperature, washed successively with methanol, dilute aqueous ammonia, and water, and dried at 60° in vacuum. 17 parts of 2-chloroquinacridine-7,14-dione are obtained.

The 20 parts of 2-phenylamino-5-(4'-chlorophenylamino)-terephthalic acid can be replaced by 20 parts of 2-phenylamino-5-(2'-chlorophenylamino)-terephthalic acid or 2-phenylamino-5-(3'-chlorophenylamino)-terephthalic acid and the process performed under the same conditions as above.

Having thus disclosed the invention what I claim is:
1. Process for the production of linear quinacridine-7,14-diones which comprises
heating to a temperature between 75° and 350° C. a 2,5-diarylamino-terephthalic acid of the formula

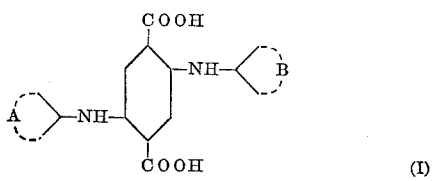

(I)

wherein each of A and B represents the atoms necessary for the completion of a cyclic radical selected from the class consisting of unsubstituted phenyl, phenyl substituted by 1 lower alkyl group, phenyl substituted by 1 nitro group, phenyl substituted by 1 lower alkoxy group, phenyl substituted by 1 cyan group, phenyl substituted by 1 methylsulfonyl group, phenyl substituted by 1 to 3 halogen atoms, naphthyl, pyrenyl and carbazyl, the acid of Formula I containing no more than 4 substituents in phenylamino radicals, in the presence of from 0.4 to 3 moles of a phosphorus halide with reference to 1 mole of the acid of Formula, I, said phosphorus halide being a member selected from the group consisting of phosphorus oxychloride, phosphorus oxybromide, phosphorus trichloride, phosphorus pentachloride, phosphorus tribromide and phosphorus pentabromide, and in the presence of an organic solvent for the phosphorus halide which is selected from the class consisting of hydrocarbons, halogenated hydrocarbons and nitrated hydrocarbons with boiling points between 100° and 300° C.

2. Process according to claim 1, wherein the phosphorus halide is phosphorus oxychloride.

3. Process according to claim 1, wherein heating is effected in the presence of trichlorobenzene.

4. Process according to claim 1, wherein heating is effected in the presence of nitrobenzene.

5. Process for the production of linear quinacridine-7,14-diones which comprises heating to a temperature between 150° to 270° C. a 2,5-diarylamino-terephthalic acid of the formula

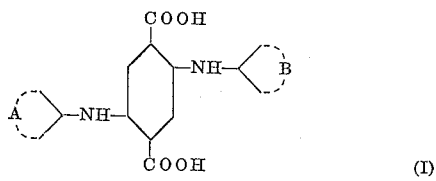

(I)

wherein each of A and B represents the atoms necessary for the completion of a cyclic radical selected from the class consisting of unsubstituted phenyl, phenyl substituted by 1 lower alkyl group, phenyl substituted by 1 nitro group, phenyl substituted by 1 lower alkoxy group, phenyl substituted by 1 cyan group, phenyl substituted by 1 methylsulfonyl group, phenyl substituted by 1 to 3 halogen atoms, naphthyl, pyrenyl and carbazyl, the acid of Formula I containing no more than 4 substituents in phenylamino radicals, in the presence of from 0.5 to 1.5 moles of phosphorus oxychloride with reference to 1 mole of the acid of Formula I and in the presence of an organic solvent for the phosphorus halide which is selected from the class consisting of hydrocarbons, halogenated hydrocarbons and nitrated hydrocarbons with boiling points between 150° to 270° C.

References Cited by the Examiner

UNITED STATES PATENTS

| 2,830,990 | 4/1958 | Stuve | 260—279 |
| 3,020,279 | 2/1962 | Woodlock et al. | 260—279 |
| 3,021,334 | 2/1962 | Smart | 260—279 |

FOREIGN PATENTS 1,233,785   5/1960   France.

OTHER REFERENCES

Albert: The Acridines, pp. 24–27 (1951).
Liebermann: Liebig's Annalen, vol. 518, pp. 245–259 (1935).

ALEX MAZEL, *Primary Examiner.*

JOHN D. RANDOLPH, *Examiner.*

DON M. KERR, DONALD G. DAUS,
*Assistant Examiners.*